United States Patent

[11] 3,585,900

[72] Inventor Joseph W. Chaivre
 Royal Oak, Mich.
[21] Appl. No. 825,331
[22] Filed May 16, 1969
[45] Patented June 22, 1971
[73] Assignee Towne Robinson Fastener Company
 Dearborn, Mich.

[54] CAPPED NUT
 4 Claims, 7 Drawing Figs.

[52] U.S. Cl. ............................................. 85/35
[51] Int. Cl. ............................................. F16b 37/14
[50] Field of Search ........................................ 85/35, 53, 54, 55

[56] References Cited
 UNITED STATES PATENTS
 336,808 2/1886 Higgin ........................... 85/35
 347,240 8/1886 Higgin ........................... 85/35
 2,178,160 10/1939 Berry ............................. 85/35

2,694,997 11/1954 Alger ............................. 85/55
 3,364,806 1/1968 Chaivre ......................... 85/35
 FOREIGN PATENTS
 524,699 8/1940 Great Britain ................. 85/55

Primary Examiner—Marion Parsons, Jr.
Attorney—Hauke, Krass, Gifford and Patalidis ABSTRACT: A nut which has a conical end extending into a cylindrical land portion. The land portion connects the conical end with a chamfered portion of the nut head which is covered with a hard corrosion resistant cap extending all around the sides of the nut head. The cap is crimped around the upper end of the nut head to retain a disc or button to close the cap of the nut. The portion of the cap adjacent the chamfered portion of the nut head is formed into a radial flange, which in assembly is crimped against the chamfered portion of the nut head to provide a secure sealing engagement of the button on the nut.

PATENTED JUN22 1971
3,585,900
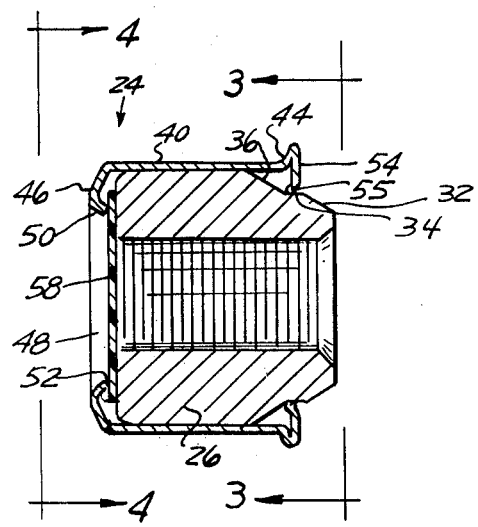
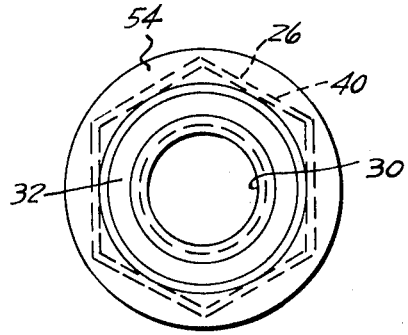
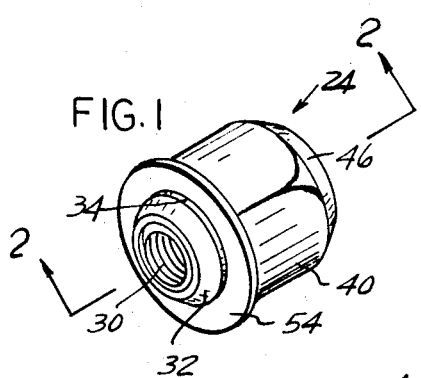
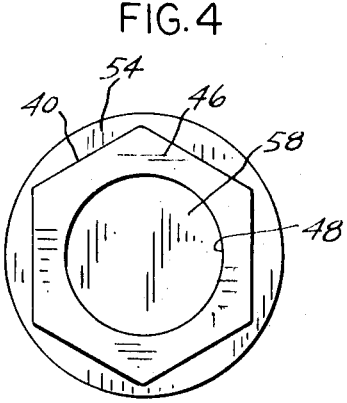
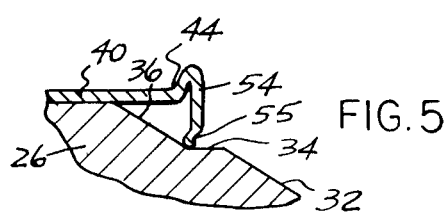
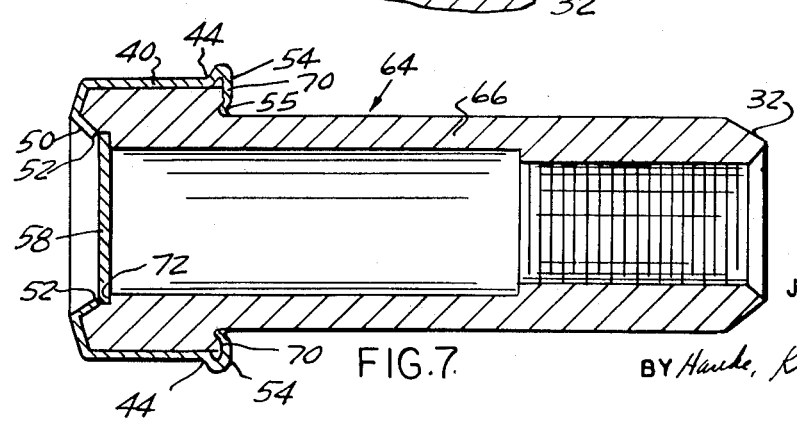
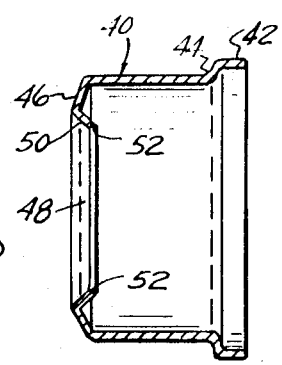
INVENTOR
JOSEPH W. CHAIVRE
BY Hauke, Kraus, Gifford, & Palidis
ATTORNEYS 3,585,900

CAPPED NUT

BACKGROUND OF THE INVENTION

1. Field of the Invention

The present invention relates to fasteners, and more in particular to a capped nut, which cap completely encases the nut head and which, in assembly, covers the normally open end of the nut for protection of the threads of the nut against corrosion and to provide a pleasing appearance, and which is additionally provided with a colored button insert.

2. Description of the Prior Art

Plated or capped nuts are known in the art, which provide a protective covering of bright, hard, corrosion and substantially wear resistant material for the nut to protect the nut against corrosion and damage by the use of a wrench and for decorative purposes.

Such a capped nut is, for instance, disclosed in my U.S. Pat. No. 3,364,806.

Capped nuts are also known, which are provided at the outer end with a disc or button insert to cover the threaded aperture of the nut and to provide an attractive appearance.

In these known nuts, however, difficulties have been encountered in securely retaining the disc or button insert within the cap of the nut in a manner preventing it from being accidentally dislodged. Due to these difficulties, the discs or button inserts in the known nuts are generally loosely retained in the cap, and this permits moisture and dirt to penetrate past the disc and into the threaded aperture of the nut, thereby causing corrosion of the threads of the nut.

A flanged nut provided with a button insert has been disclosed and described in U.S. Pat. No. 3,379,214 to E. Firth et al. The nut of this patent, however, is not capped for the purpose of providing a pleasant, shiny appearance. Further, there is no showing in the patent of the method of the present application of securing the cap to the nut to provide an integral flange in such fashion as to serve to securely retain the cap on the nut and at the same time provide a secure mounting of the button or disc member to the nut.

SUMMARY OF THE INVENTION

The present invention provides an improved nut provided with a cap of stainless steel so as to produce a pleasing appearance. The nut and the cap are constructed such as to receive and retain a colored button or disc insert at the outer end of the nut. The button is retained by a crimped marginal edge of the cap, which presses the disc onto the outer end of the nut and the other end of the cap is formed into a radial flange abutting against a cylindrical land portion of the nut adjacent a conical end of the nut. Adjacent the cylindrical land portion, the nut is provided with a chamfer disposed at an angle identical to the angle of the conical end of the nut. By this arrangement, when the nut is tightened on a stud, any member to be retained by the flange of the cap of the nut causes the flange to ride up on the chamfer of the nut provided adjacent the cylindrical land portion of the nut and to thereby tighten the cap onto the nut, and to thereby cause increased pressure to be exerted by the crimped edge of the cap on the colored disc or button insert. This provides an efficient seal between the nut, the cap, and the insert, preventing the entrance of moisture and dirt into the nut.

Additional advantages and novel features of the present improved capped nut will become apparent or will be particularly pointed out in the following detailed description.

BRIEF DESCRIPTION OF THE DRAWINGS

The following detailed description refers to the attached drawings, in which the same referenced numerals refer to similar parts throughout, and in which:

FIG. 1 is a perspective illustration of the the nut assembly shown novel capped nut assembly;

FIG. 2 is a longitudinal cross section through the nut assembly shown in FIG. 1;

FIG. 3 is a top plan view of the nut assembly shown in FIGS. 1 and 2;

FIG. 4 is a bottom plan view of the nut assembly shown in FIGS. 1 and 2;

FIG. 5 is an enlarged fragmentary view of a portion of the nut assembly shown in FIG. 2 illustrating the particular flange retaining means;

FIG. 6 is a cross section through a cap member used to cap the nut shown in FIG. 2; and FIG. 7 is a cross section through a further embodiment of a capped nut assembly according to the present invention.

DESCRIPTION OF THE PREFERRED EMBODIMENT

With reference to FIGS. 1 to 6, the capped nut assembly 24 is of improved construction and comprises a nut 26 generally made of a low carbon steel. The body of the nut is preferably hexagonal in shaped to provide a plurality of planar angularly disposed adjoining surfaces 28 adapted for engagement by a socket, wrench or the like for tightening or loosening of the nut. The nut 26 is provided with a central threaded aperture 30 adapted, in assembly, to engage the threads of a stud or the like (not shown).

The bottom of the nut 26 is provided with a radial conical surface 32, which extends into a cylindrical land portion 34. Adjacent to the land portion 34, the radial outer surface of the nut is chamfered, as at 36, preferably at an angle parallel to the angle of the conical surface 32. The top of the nut 26 is provided with a flat planar surface 38 centrally located around the threaded aperture 30.

A cap 40, illustrated separately in FIG. 6, covers the radial outer surface of the nut 26, and is preferably made of bright, polished stainless steel to produce a shiny appearance. As described in applicant's prior U.S. Pat. No. 3,364,806, the cap 40 is made of sheet metal, preferably of a thickness of between 0.015 inch and 0.030 inch. As particularly noted in FIG. 6, the cap 40 is formed to closely match the contour of the nut 26 and the bottom end of the cap is provided with an increased diameter portion in the form of a skirt 42, which forms a radial shoulder 44 around the lower portion of the cap 40. The top 46 of the cap 40 is provided with a central aperture 48 formed by an inwardly directed depression in the shape of a conical rim 50. In the completed nut assembly, as shown in FIGS. 1 to 4, the cap 40 is drawn tight over the nut body 26 so that, normally, the edge 52 of the conical rim 50 of the top aperture 48 of the cap will abut the planar top surface 38 of the nut. The skirt portion 42 of the cap is bent around the shoulder 44 to form a radial flange 54 having a central aperture providing an internal radial edge 56, which, in assembly, as shown in FIGS. 2 and 5, is adapted to be seated on the cylindrical land portion 34 of the nut between the conical end surface 32 and the chamfer 36. The flange 54 is disposed at a right angle to the radial surface of the cap 40, as can be seen in FIGS. 2 and 5, and is adapted to lock to cap 40 on the nut 26 since the flange cannot move beyond the chamfer 36 of the nut.

As herein specifically disclosed, the cap 40 of the nut assembly 24 is adapted to retain a disc or button insert 58 on top of the nut 26, which, in assembly, will close the cap aperture 48 and simultaneously the threaded aperture 30 of the nut. In assembly, as shown in FIG. 2, the disc 58 will be visible through the cap aperture 48 and for that reason is preferably colored so as to provide a convenient identification mark, as well as for aesthetic purposes. The disc 58 is made from relatively thin, flat sheet material and, although a synthetic material is preferred due to the ease of coloring, any other suitable material may be used.

The disc 58 is placed on the planar top surface 38 of the nut prior to placing the cap 40 over the nut. After the cap 40 has been put in place, the flange 54 is formed to extend around the cylindrical land portion 34 of the nut immediately adjacent the chamfer 36 and is then crimped as indicated at 55, in FIGS. 2 and 5, to thus securely lock the cap 40 on the nut 26. By means of the crimping of the flange 54 around the shoulder 44, the cap 40 will be drawn downwardly upon the nut causing the edge 52 of the cap aperture to be pressed onto the disc 58, thereby firmly locking and retaining the disc on the flat top surface 38 of the nut. Thus, a tight sealing arrangement is provided between the disc and the nut assembly to prevent the entry of dirt and moisture into the nut.

FIG. 7 illustrates a further embodiment of a capped nut assembly, which, in this instance, comprises a long nut member 64 having an internally threaded shank portion 66 extending into a hexagonal nut head 68. The junction of the hexagonal nut head with the shank portion provides a shoulder 70. The internal bore of the nut head is counterbored to provide a ridge 72, which is adapted to receive the disc 58. In assembly, the nut head 68 is capped with a cap 40 in a manner described above, except that, in this instance, the radial flange 54 of the cap is adapted to tightly abut against the shoulder 70 of the long nut and is crimped as shown at 55 to thereby firmly lock the cap 40 and disc 58 onto the nut head 68.

Thus, it is apparent from the foregoing description that by the present disclosure an improved capped nut has been provided having means to securely retain a colored disc visible within the head of the nut and having resilient flange means to firmly lock the cap on the nut to assure a tight sealing engagement between the disc and the nut.

I claim:
1. A capped nut assembly comprising in combination:
   a nut having top and bottom surfaces, a plurality of planar side surfaces, an annular chamfer contiguous with the side surfaces and between the side surfaces and the bottom surfaces, and a threaded bore extending between the top and bottom surfaces,
   a cap of resilient material disposed over the nut and having a plurality of side surfaces overlying the side surfaces of the nut to prevent relative rotation between the cap and the nut, a top having an in-turned rim defining an aperture,
   a decorative disc overlying the top surface of the nut and engaged by said rim,
   said cap having formed thereon a radial flange defining a flat, annular surface parallel to said bottom surface and an internal radial edge which engages said chamfer such that tightening the nut against a fixed surface causes the radial edge to resiliently move up the chamfer and force said rim into increasingly tighter engagement with said disc.
2. A capped nut assembly as defined in claim 1 wherein said resilient material is polished stainless steel.
3. A capped nut assembly as defined in claim 1 wherein said disc is made of brightly colored plastic.
4. A capped nut assembly as defined in claim 1 wherein said nut and said cap are hexagonal.